United States Patent [19]
Rathke

[11] Patent Number: 5,813,040
[45] Date of Patent: Sep. 22, 1998

[54] WRITE CONTROLLER FOR A CAM-BASED SWITCH WITH LINERALY SEARCHABLE MEMORY UTILIZING HARDWARE-ENCODED STATUS TAGS TO INDICATE AVALIABLITY OF EACH MEMORY LOCATION FOR WRITING

[76] Inventor: John Edmund Rathke, 35 Hamilton Rd., Waltham, Mass. 02154

[21] Appl. No.: 581,742

[22] Filed: Dec. 29, 1995

[51] Int. Cl.$^6$ .................................................. G06F 12/02
[52] U.S. Cl. ......................... 711/156; 395/311; 395/875; 711/108
[58] Field of Search .................................. 395/435, 311, 395/875; 365/49, 50; 370/381, 382, 383; 711/108, 156

[56] References Cited

U.S. PATENT DOCUMENTS

| | | | |
|---|---|---|---|
| 4,603,416 | 7/1986 | Servel et al. | 370/60 |
| 4,754,451 | 6/1988 | Eng et al. | 370/60 |
| 4,760,570 | 7/1988 | Acampora et al. | 370/60 |
| 4,829,475 | 5/1989 | Ward et al. | 365/78 |
| 4,862,412 | 8/1989 | Fried et al. | 365/49 |
| 5,268,896 | 12/1993 | Pauwels | 370/60 |
| 5,301,055 | 4/1994 | Bagchi et al. | 359/139 |
| 5,345,229 | 9/1994 | Olnowich et al. | 340/825.8 |
| 5,367,520 | 11/1994 | Cordell | 370/60 |
| 5,404,537 | 4/1995 | Olnowich et al. | 395/725 |
| 5,406,554 | 4/1995 | Parry | 370/58.1 |
| 5,471,468 | 11/1995 | Sandin et al. | 370/60 |
| 5,506,809 | 4/1996 | Csoppenszky et al. | 365/221 |
| 5,511,070 | 4/1996 | Lyles | 370/60 |
| 5,513,134 | 4/1996 | Cooperman et al. | 365/49 |
| 5,517,495 | 5/1996 | Lund et al. | 370/60 |
| 5,519,698 | 5/1996 | Lyles et al. | 370/60 |
| 5,546,391 | 8/1996 | Hochschild et al. | 370/60 |
| 5,574,875 | 11/1996 | Stansfield et al. | 395/403 |
| 5,577,035 | 11/1996 | Hayter et al. | 370/60 |
| 5,583,861 | 12/1996 | Holden | 370/395 |
| 5,590,123 | 12/1996 | Lyles et al. | 370/397 |
| 5,612,951 | 3/1997 | Yu et al. | 370/395 |
| 5,636,210 | 6/1997 | Agrawal | 370/390 |

OTHER PUBLICATIONS

Schultz et al. "CAM–based Single–Chip Shared Buffer ATM Switch," International Communications Conference 1994.
Mead et al. "Introduction to VLSI Systems," Addison–Wesley, 1980, pp. 22–23, 150–151.
Weste et al. "Principles of CMOS VLSI Design,"Addison–Wesley, 1985, pp. 322–326.
Milliman J. "Microelectronics Digital and Analog Circuits and Systems," McGraw–Hill, 1979, pp. 192–193.
Schultz et al. "Fully–Parrallel Multi–Megabit Integrated CAM/RAM Design," 1994 IEEE.

*Primary Examiner*—Eddie P. Chan
*Assistant Examiner*—Gary J. Portka
*Attorney, Agent, or Firm*—Leonard C. Suchyta; Floyd E. Anderson

[57] ABSTRACT

A write controller for a signal switch with a linearly searchable memory eliminates the need to maintain an ordered list of free addresses. The write controller utilizes a hardware encoded bit map and search logic to search linearly for memory locations that do not contain valid data and can therefore be written to. The search stops at the first memory location where the bit map tag indicates that the memory location is available, and then the write control logic unit associated with that memory location sends a kill signal that tells downstream write control logic units associated with other memory locations to deactivate. The write controller writes the data into the selected memory location and flips the status bit of that location to indicate that the memory location is no longer available for writing. The write controller then releases the restraining kill signal, allowing the next available memory location in line to receive data during the next clock cycle. The status bit for the memory location that was just written to continues to indicate that the memory location is not available for writing to until either the data is read out of the memory location or the system is reset. The memory location can during this time be read, but not written to. When a read of the location subsequently occurs in response to a read signal, the internal status bit is then flipped again so that the memory location will again be available to receive data.

14 Claims, 4 Drawing Sheets

WRITE CONTROLLER FOR A CAM-BASED SWITCH WITH LINERALY SEARCHABLE MEMORY UTILIZING HARDWARE-ENCODED STATUS TAGS TO INDICATE AVALIABLITY OF EACH MEMORY LOCATION FOR WRITING

FIELD OF THE INVENTION

The present invention relates to electronic data communications systems and, in particular, to high speed electronic signal switching systems.

BACKGROUND OF THE INVENTION

Prior implementations of asynchronous transfer mode (ATM) content addressable memory (CAM)-based switches use First In, First Out (FIFO) memories to store ordered lists of available locations in the switch fabric [See, e.g., K. J. Schultz and P. G. Gulak, "CAM-based Single-Chip Shared Buffer ATM Switch," 1994 *International Communications Conference* (ICC '94)]. A write controller based on a FIFO requires a complex controller and an initialization procedure in order to operate properly. In addition, since addresses must continuously circulate in through the FIFO, it is possible for an address to become corrupted and therefore be "lost" until the system is reset. The result of loss of an address is that the switch will no longer have that memory location "available" for purposes of data storage.

In general, a switch with a CAM-based search engine does not actually need to know the specific address of a free location in the switch fabric memory. Because data in a CAM is accessed through a content-based search, all that is actually required is the knowledge that a memory location is available, as well as a way to access it. The specific address of the memory location is therefore irrelevant, with only the data in the location being important.

Access to the memory location may be obtained via a hardware search. Hardware searches are capable of selecting one location out of many available locations. The concept of selection of only one of a number of available "hits" is utilized in one form by a priority encoder. A priority encoder examines the data-path for a set input and encodes the position of that input for use by the control path. The code generated will vary depending on which input is the high one. It is possible that more than one input to a priority encoder is high. The encoder deals with this by giving priority to the highest-order data line that is high, generating a code based on that input, and ignoring the remaining high inputs. [See, e.g., J. Millman, *Microelectronics*, McGraw-Hill, 1979, §6–8, pp. 192–193; *National CMOS Data Book*]

In the write controller of the present invention, a linear search made for an available memory location is stopped when the first available memory location is found, with all other available memory locations then being prevented from being written to by the propagation to them of a kill signal. The search performed by the write controller differs from the operation of the priority encoder in that it is entirely linear, stopping always at the first available memory location, rather than examining all the available locations found in order to ascertain which is of the "highest order." Use of a linear, non-discriminatory, search presents great efficiencies of operation, particularly in a switch with a large number of memory locations.

The concept of propagation of signals down a chain of individual circuits is seen in one form in a Manchester carry chain, which is used for propagating carry signals in parallel adders. [See, e.g., C. Mead and L. Conway, *Introduction to VLSI Systems*, Addison-Wesley, 1980, pp.22–23, 150–151; N. Weste and K. Eshraghian, *Principles of CMOS VLSI Design*, Addison-Wesley, 1985, pp. 322–326]. In each stage of the adder, a carry-propagate signal is derived from two input variables to the adder and then applied to a pass transistor. The source of the transistor is the "carry-in" to the present stage and the drain is the "carry-out" to the next stage. The carry signal is therefore propagated only so long as the result of the operation of each stage of the adder on the signal carried in from the previous stage warrants it.

In the write controller of the present invention, a kill signal is propagated from a write control logic unit which has just written data into a memory location to the write control logic units of all downstream memory locations. In this way, the controller is prevented from attempting to write the same data into more than one available memory location. The signal propagation of the present invention differs from that of a Manchester carry chain in that a kill signal from an upstream memory location will be passed down the chain without being affected or operated on by the write control logic units of succeeding memory locations. Therefore, only the state of the memory location initiating the kill signal can affect whether or not the signal continues to be propagated, whereas in a carry chain it is the states of the propagating stages of the adder that determine whether or not the signal continues downstream.

The hardware search based write controller of the present invention takes advantage of the fact that CAM-based search engines do not need to know the specific address of a free location in memory. It eliminates the need for a FIFO, and the corresponding complex controller and initialization process. It also eliminates the susceptibility to errors. Further, since the hardware search uses a bit map to identify valid data, the same hardware can be used to prevent CAM hits on invalid locations. By using the bit map to check that there is actually valid data in an address received through a content map, there is no need to physically reset addresses that are no longer valid.

OBJECTS OF THE INVENTION

Accordingly, the primary objects of the present invention are to eliminate the need found in prior art switch write controllers to maintain an ordered list of free memory addresses, to eliminate the need for the complex controller and initialization procedures that are required when using a FIFO, to eliminate potential loss of an address from usable memory until the system is reset, and to prevent CAM hits on invalid locations.

SUMMARY

The write controller of the present invention uses a linear search that stops at the first memory location that is available to be written to. The input data is written into that first location, and all available memory locations after the first one found are ignored. The preferred embodiment has three functional parts: a hardware encoded bit map that tags locations containing valid data with status bits, read/write control logic, and search logic for selecting available memory locations. The invention can be used with any type of memory where a search can be made for the first available memory location.

In a preferred embodiment, the write controller utilizes the bit map and search logic to search linearly for memory locations that do not contain valid data and can therefore be written to. The search stops at the first memory location where the bit map tag indicates that the memory location is available, and then the write control logic unit associated with that memory location sends a kill signal that tells all the downstream write control logic units associated with other memory locations to deactivate because the first location has been selected for writing to. The write controller then waits for a write signal from the read/write control logic, writes the data into the memory location, and flips the status bit to indicate that the memory location is no longer available for writing. This action also releases the restraining kill signal previously placed on the write control logic units of downstream memory locations, allowing the next available memory location in line to receive data during the next clock cycle. The status bit for the memory location that was just written to continues to indicate that the memory location is not available for writing to until either the data is read out of the memory location or the system is reset.

Once a memory location is written to, the ability to write to that memory location changes state so that the memory location can then be read, but not written to. When a read of the location subsequently occurs, the internal status bit is then flipped so that the memory location will again be available to receive data. In a preferred embodiment, the reading of data out of a memory location is controlled by a read signal that is generated by a content match in the CAM.

DETAILED DESCRIPTION OF THE PREFERRED EMBODIMENT

The switch write controller of the present invention was designed to utilize the fact that a hardware search is capable of, and relatively efficient at, selecting one location out of many available memory locations. A linear search is used that stops at the first memory location that is available to be written to. All available memory locations after the first one found are therefore ignored, and the input data is written into that first location.

In the preferred embodiment, three functional parts are required: a hardware encoded bit map that tags locations containing valid information, control logic for synchronization of the read and write functions, and search logic. The invention can be used with any type of memory where a search can be made for the first available memory location, e.g. any memory with content-based lookup, such as a content-addressable memory (CAM).

Figure 1:
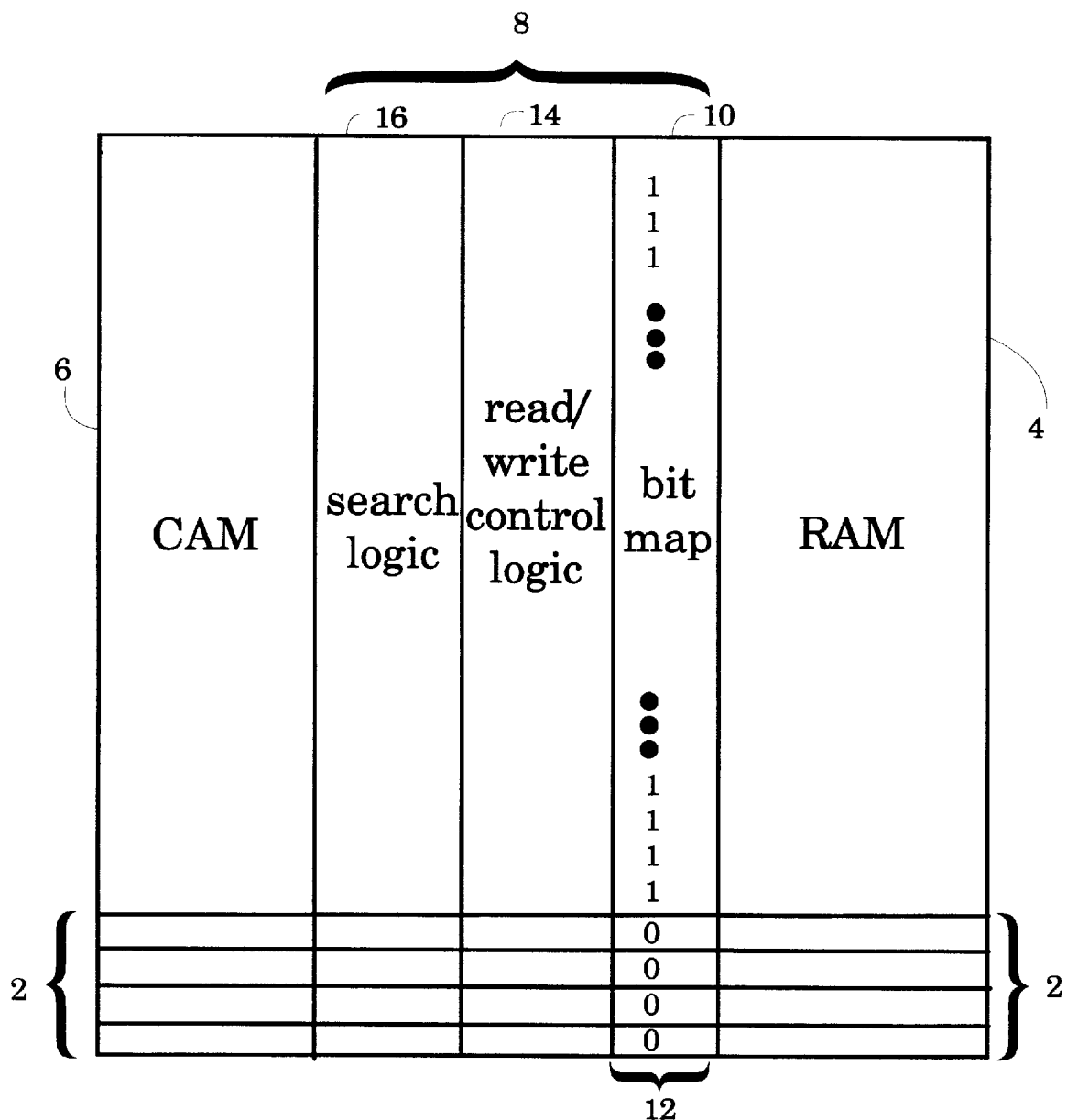
FIG. 1 is a logical block diagram of a CAM-based switch fabric utilizing the write controller of the present invention.

A logical representation of a preferred embodiment of the invention is shown in FIG. 1 for a CAM-based switch fabric. The horizontal lines at the bottom of the diagram represent individual memory locations 2 in a random-access memory (RAM) 4 and a content-addressable memory (CAM) 6. The write controller 8 has three functional parts. A bit map 10 contains status bits 12 that are used as tags to mark memory locations 2 that are already holding valid data. The read/write control logic 14 synchronizes the read and write functions of the controller, while the search logic 16 finds memory locations that are available to be written to.

Physically, the write controller 8 will typically be composed of a chain of individual write control logic units, with there being one write control logic unit per memory location 2 in the switch.

In a preferred embodiment, the write controller 8 utilizes the bit map 10 and search logic 16 to locate memory locations 2 that do not contain valid data and can therefore be written to. Searching linearly, it stops at the first memory location 2 where the bit map tag 12 is high ("1"), indicating that the memory location 2 is available. A tag, or status bit 12, of "0" (low) indicates that the memory location contains valid data and therefore cannot be written to. Once the search logic 16 finds a memory location 2 that is available, it sends a kill signal that tells all the downstream write control logic units associated with other memory locations to deactivate.

The write controller 8 then waits for a write signal from the read/write control logic 14. When the write signal is received, the read/write control logic 14 clocks the memory location, taking a "snapshot" of the data and writing it into the memory location 2. The status bit 12 is then flipped and set to low, indicating that the memory location 2 is no longer available for writing. This action also releases the restraining kill signal that was placed on the write control logic units of downstream memory locations 2, allowing the next available memory location 2 in line to receive data during the next clock cycle. The status bit 12 for the memory location 2 that was just written to will then remain low until either the data is read out of the memory location 2 or the system is reset.

In a preferred embodiment, the reading of data out of a memory location 2 is controlled by a read signal that is generated by a content match in the CAM 6. The content match causes the activation of a particular write control logic unit, clocking the memory location 2 and flipping the status bit 12 to high.

When a memory location 2 is written to, the ability to write to that memory location changes state. This state will not change again until either the memory location is read from or the system is reset. The memory location can thereafter be read, but not written to. When a read of the location is subsequently performed, the internal status bit 12 is flipped to high, so that the memory location 2 will again be available to receive data. The read and write cycles are asynchronous in that the status bit 12 is flipped before the write control logic unit is cleared. The write control logic unit is not cleared to make the memory location again available for writing to until the next rising transition of the write clock.

Figure 2:
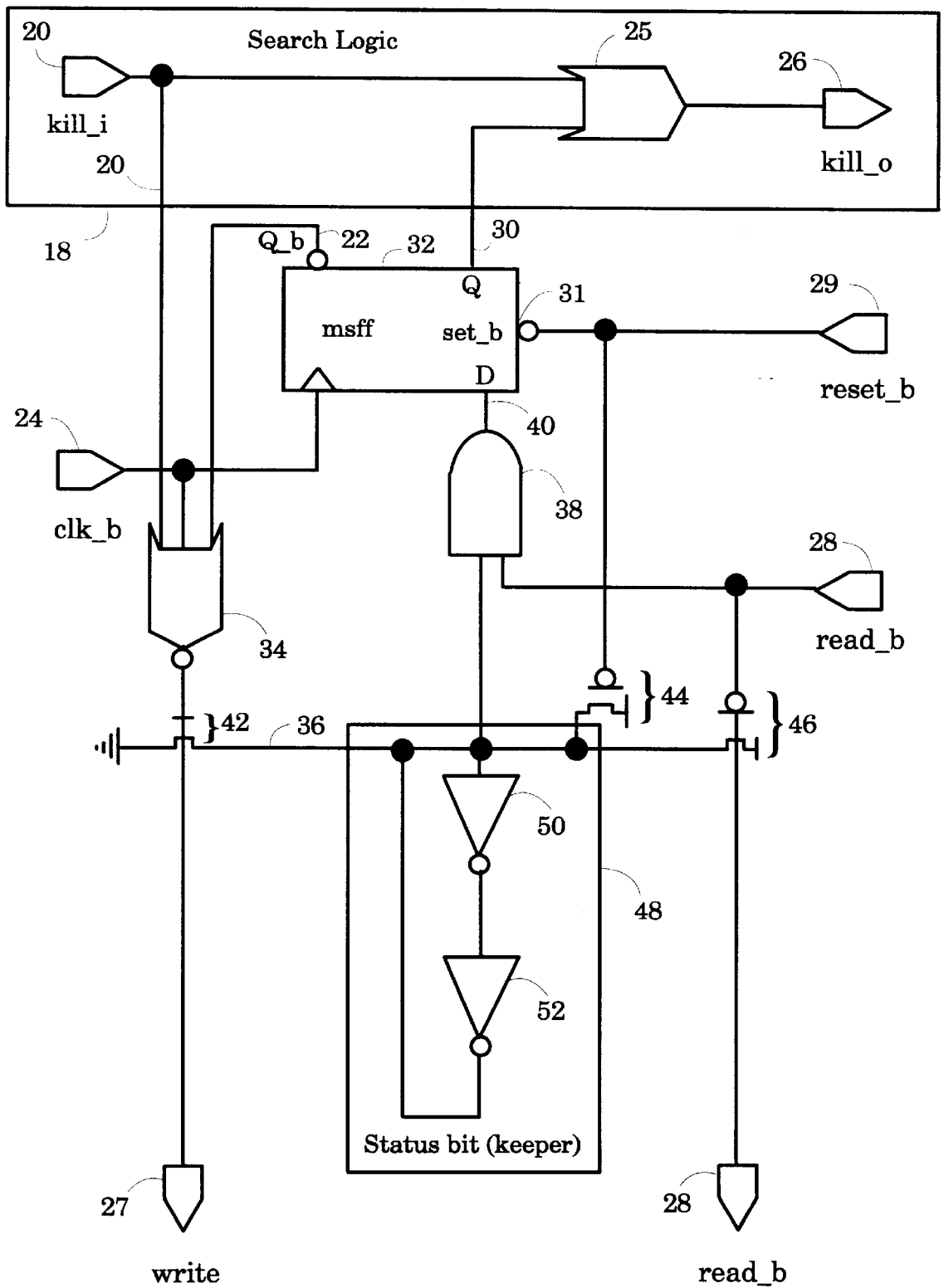
FIG. 2 is a diagram of a write control logic unit of one embodiment of the present invention.

A write control logic unit for an individual memory location 2 in one embodiment is shown in detail in FIG. 2. The external control signals, kill_i 20, clk_b 24, read_b 28, and reset_b 29 are used in combination with logic gates, a master-slave flip-flop (msff) 32, and a keeper 48 to tell the write controller whether the memory location 2 is available for writing, to send a kill signal to downstream memory locations if the memory location is the next in line to be written, to propagate kill signals received from upstream memory locations, to write to the memory location, to tell the write controller that the memory location is no longer available to be written to, to read from the memory location, and to tell the write controller after a read that the memory location has become re-available.

In this embodiment, the write control unit is composed of three parts: the search logic 18, the keeper 48, and the remaining read/write control logic. The search logic 18 determines whether this memory location is available for writing and initiates a high kill_o 26 signal to downstream memory locations when this memory location is selected to be the next in line to be written to. It also propagates down the chain any high kill_i signal 20 that is received from an upstream memory location that has already been selected for writing to. The kill_i signal 20 coming into the first write control logic unit in the memory location chain is tied to ground, since there is no memory location ahead of it that could possibly be available to be written.

The input carrying the external kill_i signal 20 comes in from the chain of upstream memory locations and is OR'd with the noninverted data output (Q) 30 of the msff 32 that comes in from the read/write control logic. The output of the OR gate 25, kill_o 26, is sent to downstream memory locations. When the entering kill_i 20 is high, some upstream memory location has already been selected for writing to and the kill_o signal 26 output from the OR gate 25 will always be high, regardless of the state of this particular memory location. The write control logic unit for this memory location is therefore essentially deactivated, serving only to propagate the kill signal farther down the chain.

When the entering kill_i 20 is low, indicating that no upstream memory location has been selected for writing, and this memory location does not contain valid data and is therefore available for writing, OR'ing the low kill_i 20 with the high noninverted msff output (Q) 30 gives an output kill_o 26 that is high. This memory location is then selected as the next in line to be written to. The selection of any memory location as the next to be written initiates a high kill_o signal 26, which is propagated by the write control logic unit to the downstream write control logic units of other memory locations, preventing writing to all downstream memory locations. If the entering kill_i is low, but the memory location is already filled with valid data so that Q 30 is also low, kill_o will be low and this memory location will have no current effect on anything that goes on downstream in the chain.

Writing to, and reading from, the memory location are controlled in this embodiment by the read/write control logic. In order for writing to a memory location to be enabled, the external kill_i input 20 must be low and the external clock (clk_b) 24 must have made a transition to the low state. In addition, the memory location must not contain valid data. The lack of valid data is indicated by a high at the storage node of the msff 32, which, after inversion at the output of the msff 32 produces a low at Q_b 22. The low kill_i 20, clk_b 24, and Q_b 22 signals are then input through a NOR gate 34, producing a high on the write signal line 27, which causes the memory location 2 to be opened for writing. The write signal 27 goes across the attached RAM 4 and opens the inputs for the storage elements.

When the write takes place, the high on the write line 27 activates the N-transistor 42 that is connected to a cross-line keeper node 36 after the NOR gate 34. The N-transistor 42 has one port tied to ground (0 V potential) and is active, allowing the cross-line keeper node 36 to conduct current, when the input line is high. The cross-line keeper node 36 is also connected to two P-transistors 44 and 46 that are each tied to VDD (5 V potential) and are active, allowing the cross-line keeper node 36 to conduct current, when the input line is low. Activation of the N-transistor 42 pulls the keeper 48 that is also connected to the cross-line keeper node 36 to low, indicating that the memory location is no longer available to be written to.

The keeper 48 stores the status bit 12 for the memory location 2. In the keeper 48, two inverters 50 and 52 are cascaded to act like a latch. The second inverter 52 has very long channel devices which allow weak feedback. Therefore, while the keeper 48 can be put into one state or another, that state can be easily perturbed. The purposes of the keeper 48 are to prevent the cross-line keeper node 36 from floating during those times when the three transistors 42, 44, and 46 are inactive, and to indicate the availability of the memory location 2 for writing. In response to a reset_b 29 low pulse, the P-transistor 44 operates to pull the cross-line keeper node 36 to high and then becomes inactive, going to a high impedance state. This causes the keeper 48 to remain high until data is written to the memory location 2 and the cross-line keeper node 36 is accordingly pulled low by the activation of the N-transistor 42. In an alternate embodiment, a flip-flop takes the place of keeper 48.

The cross-line keeper node 36 value is input through an AND gate 38 along with the external read_b signal 28, which remains high during a write. This pulls the msff 32 data input D 40 to low, driving the storage node marking valid data in the msff 32 to low, and indicating that the memory location now contains valid data. Q_b 22 consequently goes high, causing the write signal 27 to be pulled low after the operation of the NOR gate 34. This transition captures the input data in the attached RAM 4. The write signal 27 being pulled low prevents subsequent writes to the memory location 2 until either the data is read or the write control logic unit is reset by the external reset_b signal 29 being pulsed low.

A write to the memory location 2 causes the non-inverting output Q 30 of the master-slave flip-flop 32 to be driven low, causing the write control logic unit to release the high kill_o 26 signal that was previously propagated downstream. After a write, the only thing that can change the state of the connected keeper 48 is a read_b 28 or reset_b 29 pulse. The kill_o 26 signal therefore goes low and the next available memory location in the chain will have the opportunity to get written to during the next write cycle.

A read_b signal 28 pulse is generated by a content match within the CAM 6 and is then clocked through to change the state of the write control logic unit. The read_b 28 pulse activates the P-transistor 46, pulling the keeper 48 high. This transition of the status bit 12 to high indicates that the memory location is now available to be written to. The cross-line keeper node 36 high is also input through the AND gate 38 along with the read_b signal 28, which returns to high after the pulse, producing a high at msff data input D 40. If the read_is of this particular memory location 2, the write control logic unit for the memory location 2 is prevented from clearing until the next clock cycle.

The read and write cycles are asynchronous because the state of the keeper 48 changes immediately when a read_is made on the memory location 2, but the change does not also immediately become externally visible. External visibility and the actual ability to write to the memory location 2 are controlled by the master-slave flip-flop 32, the outputs of which, Q 30 and Q_b 22, do not change until the next rising clock transition because the msff 32 is positive edge triggered. When clk_b 24 returns high, the write control logic unit is cleared, with both Q 30 and the storage node of the msff 32 going high, indicating that the memory location 2 no longer contains valid data, and Q_b 22 going low. Q 30 is then input through OR gate 25 with kill_i 20 to produce a high kill_o 26. If kill_i 20 is low, this memory location will now be the next to be written to.

In an alternate embodiment, the write controller is configured to write to the memory location 2 on the transition of clk_b 24, to read_multiple times from the memory location on multiple read_b 28 signal pulses, and then to clear the write control logic unit when a combination of read_b and clk_b is received. This embodiment in particular facilitates multicasting.

Reset of the write control logic unit operates much like the clear after a read_. The reset_b signal 29 is pulsed. The low activates the P-transistor 44 which pulls the keeper 48 high, indicating that the memory location is available to be written to. After the AND 38 with read_b 28, which is already high, the msff data input D 40 is pulled high. After inversion, the reset_b pulse 29 is applied to the msff 32 at set_b 31, causing Q 30 to go high and Q_b 22 to go low. The P-Transistor 44 then deactivates at the end of the reset_b 29 pulse and the cross-line keeper node 36 remains high.

Figure 3:
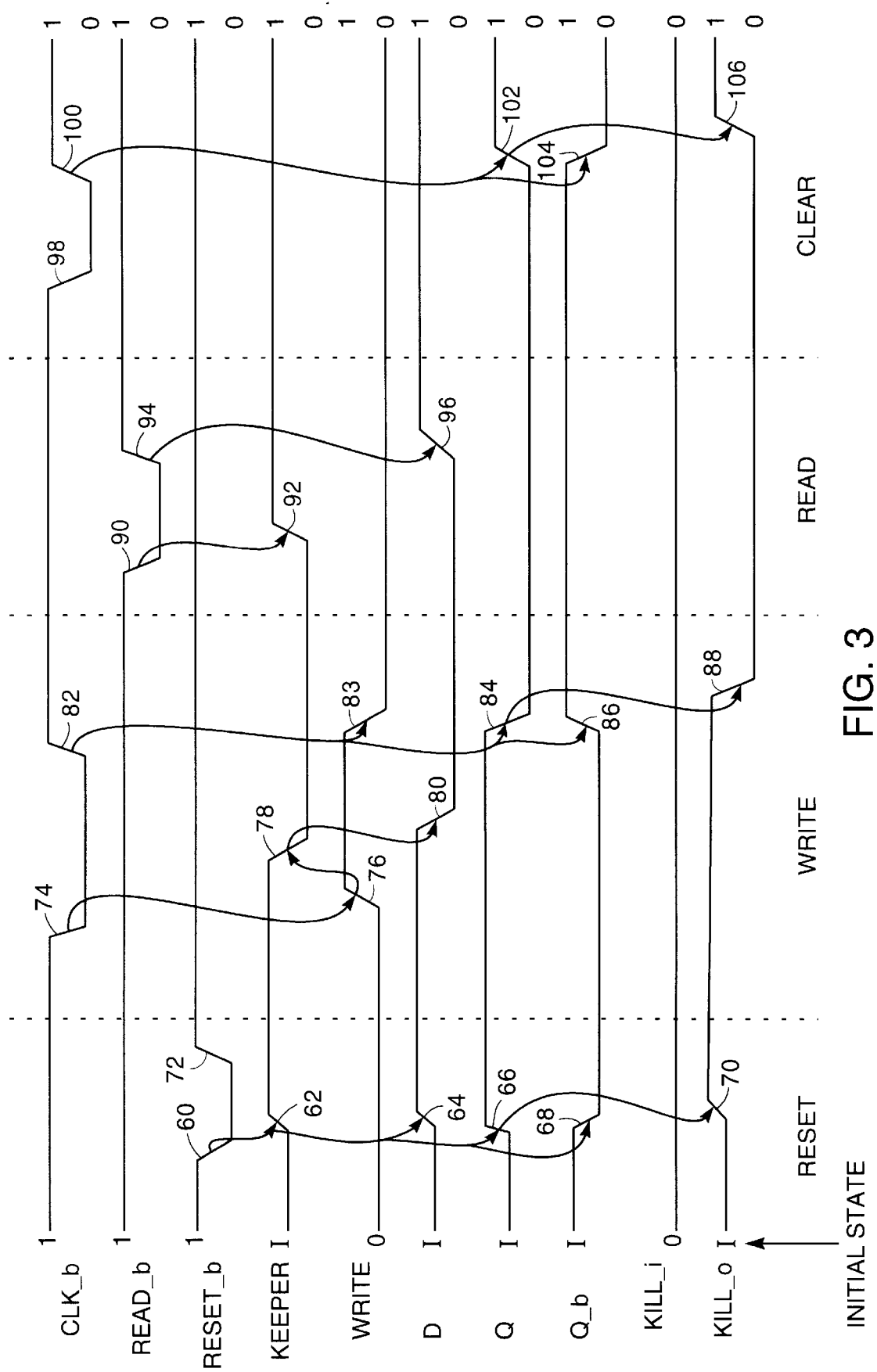
FIG. 3 is a timing diagram for the operation of a write control logic unit of one embodiment of the present invention.

Fig.3 is a timing diagram which illustrates the sequence of signal transitions in an embodiment of the write control logic unit. Initially, kill_i 20 is low, kill_o 26 is indeterminate, clk_b 24 is high, read_b 28 is high, reset_b 29 is high, write 27 is low, and the cross-line keeper node 36, the msff data input (D) 40, the inverted msff output (Q_b) 22 and the noninverted msff output (Q) 30 are indeterminate. When the write controller is initialized, or the system is reset, reset_b 29 is pulsed once to a low position 60, then goes back to high 72 and remains that way. The low transition 60 of reset_b 29 pulls the cross-line keeper node 36 high 62.

The high 62 at the cross-line keeper node 36 causes the data input D 40 of the msff 32 to go high 64. The low 60 on reset_b 29 causes the noninverted output (Q) 30 of the msff 32 to go high 66 as well, and Q_b 22 to consequently be low 68. The transition of Q 30 to high also causes kill_o 26 to go high 70 and a kill_signal to be propagated to downstream memory locations. The first available memory location 2 in the chain, however, will have a low Q 30 which produces a low kill_o 26, indicating that this memory location is available and will be next to be written to.

When a write is called for, clk_b 24 transitions low 74, causing the write signal 27 to go high 76. This in turn pulls the cross-line keeper node 36 low 78, followed by a transition to low 80 of the msff data input D 40. The subsequent rising transition 82 of clk_b 24 drives Q 30 low 84 and Q_b 22 high 86 and causes write 27 to go low 83. The low 84 of Q 30 then causes the kill_o signal 26 to go low 88.

Figure 4:
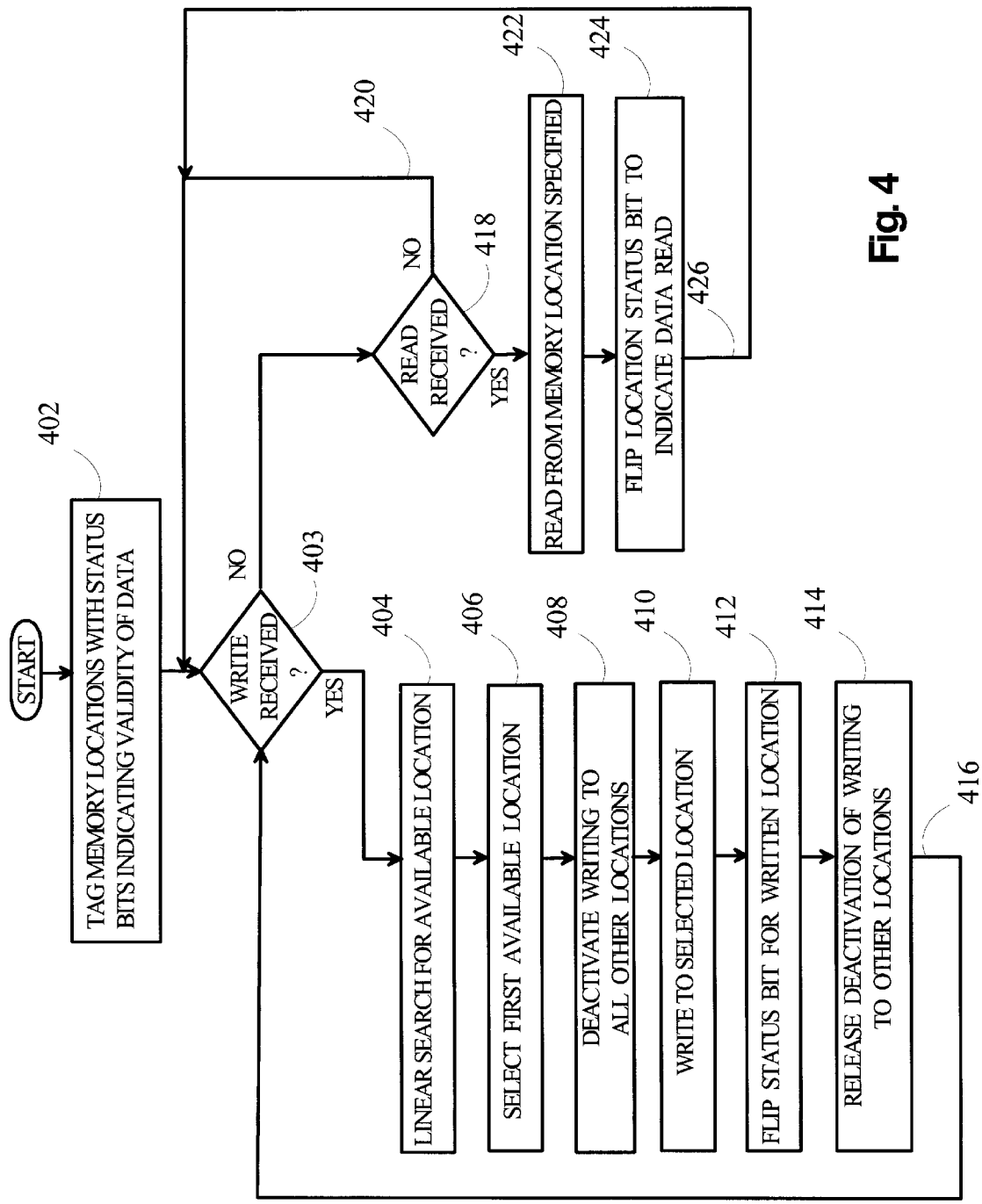
FIG. 4 is a logical block diagram illustrating the method of operation of the write controller of the present invention.

A read_b 28 pulse is generated by a content match in the CAM 6. When read_b 28 goes low 90, the cross-line keeper node 36 is pulled high 92. When read_b 28 returns high 94, the msff data input D 40 is pulled high 96. During the next clk_b 24 falling edge 98, a different memory location 2 is being written to. The current write control logic unit is cleared during the rising edge 100 of the clk_b 24 pulse, causing Q 30 to go high 102, Q_b 22 to go low 104, and kill_o 26 to go high 106. The method of operation of one embodiment of the write controller of the present invention is further illustrated by the logical block diagram of FIG. 4. As seen in FIG. 4, a hardware-encoded tag map is used to tag 402 each linearly searchable memory location of a signal switch with a hardware-based status tag that indicates whether or not that particular memory location contains valid data. When a "write" signal is received 403, the write controller initiates a linear search 404 for a memory location that does not contain valid data and is therefore available to be written to, accomplished by sequential examination of the hardware-based status tags associated with the switch memory until the first status tag is found indicating that the associated location does not contain valid data. The memory location associated with this status tag is then selected for writing 406, and the ability to write to any other memory location is deactivated 408. In one embodiment of the invention, propagation of this "kill" signal 408 is accelerated by using look-ahead logic to propagate the signal to groups of nonselected available memory locations at a time. The write controller next writes the data to the selected location 410 and alters the hardware-based status tag for that location 412 to indicate that the location now contains valid data. Finally, the deactivation of the ability to write to all other memory locations is released 414, and the write controller returns to a signal-waiting state 416.

In this embodiment of the write controller of the present invention, if a read signal is received 418, the controller reads from the particular memory location specified 422. After the data has been read out of the specified memory location 422, the controller alters the status tag associated with that memory location 424 to incicate that the location no longer contains valid data. The controller then returns 426 to a signal-awaiting state. In a preferred embodiment, the controller is configured to allow multiple reads from the specified memory location 422 in order to facilitate multicasting. In a preferred embodiment of a write controller withe multicast capability, the hardware-based status tag is a hardware counter that is incremented after each read until the status tag indicates that the number of reads necessary to output the data to all the specified multicast channels have been performed. The controller reads from the specified memory location 422, increments the status tag afterward 424, and then repeats theis process until the status tag incicates that the required number of reads have been performed.

For a large memory, there can be significant propagation delay because of the use of a linear search. Since the memory locations are chained, their status bits 12 must be examined one at a time. This limitation is minimized in an alternate embodiment by using look-ahead technology to compute signal carries for groups of bit positions rather than for one status bit at a time. The propagation of the kill signal can therefore be accelerated by using look-ahead logic. This look-ahead logic can also be pipelined, with each additional stage of the pipeline increasing the size of the memory that can be handled efficiently In other embodiments, the validation bit map 10 is extended to use multiple status bits 12 or a counter as a tag. These embodiments facilitate the implementation of multicast functions in the switch fabric because they allow a particular memory location to be read several times.

Modifications and substitutions by one of ordinary skill in the art are considered to be within the scope of the present invention, which is not to be limited except by the claims which follow.

What is claimed is:

1. A hardware-based write controller for a signal switch, said signal switch having a plurality of memory locations, said write controller comprising, in combination:

hardware-encoded bit map means for tagging each one of said plurality of memory locations containing valid data, said hardware-encoded bit map means containing a plurality of independently hardware-encoded status tags such that each one of said plurality of memory locations is logically associated with at least one of said plurality of independently hardware-encoded status tags;

hardware-based search control means for finding available ones of said plurality of memory locations by examining only said hardware-encoded status tags; and read/write control means for synchronizing the read and write functions of said write controller; comprising, in combination:

means for writing to one of said available ones of said plurality of memory locations;

means for reading from one of said plurality of memory locations containing valid data; and means for changing at least one of said status tags associated with said memory location that is written to so as to indicate that said memory location now contains valid data; and means for changing at least one of said status tags associated with said memory location that is read from to indicate that it has been read from.

2. The write controller of claim 1, wherein said search control means further comprises, in combination:

means for selecting, utilizing said status tags, one of said available ones of said plurality of memory locations to be written to; and means for deactivating writing to all other available ones of said plurality of memory locations once said memory location to be written to has been selected.

3. The write controller of claim 2, wherein said read/write control means further comprises means for releasing the deactivation of writing to said all other available memory locations once said selected memory location has been written to.

4. The write controller of claim 3, wherein said search control means further comprises look-ahead means for minimizing signal propagation delay.

5. The write controller of claim 3, wherein each of said status tags comprises at least one status bit.

6. The write controller of claim 3, wherein each of said status tags is updated by a corresponding counter that is incremented after each read operation until said status tag reaches the total number of reads necessary from said memory location.

7. The write controller of claim 3, further comprising means for supporting multicasting.

8. A write controller for a signal switch, said signal switch having a memory containing a plurality of memory locations, said memory being searchable in a linear fashion, said write controller comprising a plurality of hardware-based write control logic units, each of said plurality of write control logic units being associated with a respective one of said plurality of memory locations and each of said write control logic units comprising, in combination:

hardware-encoded independent status bit means for indicating when said memory location contains valid data and when said memory location is available for writing to;

search logic means, comprising, in combination:
means for propagating a kill signal received from another write control unit; and
means for initiating a kill signal to be sent to deactivate other write control logic units when said memory location is selected for writing to; and read/write logic means, comprising, in combination:
means for writing to said memory location when it is selected;
means for reading from said memory location in response to a read signal;
means for flipping said hardware-encoded independent status bit means upon writing to, or reading from, said memory location; and
means for releasing said initiated kill signal when said memory location has been written to.

9. The write controller of claim 8, wherein said status bit means is stored via a keeper latch.

10. The write controller of claim 8, wherein said status bit means is stored via a flipflop.

11. The write controller of claim 8, further including means for multicasting.

12. A method for controlling the write and read functions of a signal switch having a plurality of memory locations searchable in a linear fashion, comprising the steps, in combination, of:

tagging each of said plurality of memory locations with at least one independent hardware-encoded status tag to indicate whether each of said plurality of memory locations contains valid data or is available for writing to;

searching linearly for the first one of said plurality of memory locations that is available for writing to by examining only said independent hardware-encoded status tags;

selecting said first available memory location for writing to;

deactivating writing to all other available ones of said plurality of memory locations;

writing to said selected available memory location;

indicating that said selected available memory location contains valid data after said selected available memory location has been written to by altering said at least one independent hardware-encoded status tag associated with said selected available memory location;

releasing said deactivation of writing to said all other available memory locations after said selected memory location has been written to;

reading from a specified one of said plurality of memory locations in response to a received read signal; and indicating that said read-from memory location has been read from by altering at least one of said independent hardware-encoded status tags.

13. The method of claim 12, further comprising steps for multicasting, said steps for multicasting comprising:

incrementing at least one of said independent hardware-encoded status tags each time said specified memory location is read from; and continuing to read from said specified memory location and incrementing said independent hardware-encoded status tag until said memory location has been read from a number of times equal to a number of multicast outputs specified.

14. The method of claim 12, wherein said step of deactivating writing to said all other available memory locations utilizes look-ahead signal propagation to minimize signal propagation delay by propagating a kill signal simultaneously to said all other available memory locations in groups.

* * * * *

UNITED STATES PATENT AND TRADEMARK OFFICE
CERTIFICATE OF CORRECTION

PATENT NO. : 5,813,040
DATED : 9/22/98
INVENTOR(S) : John Edmund Rathke

It is certified that error appears in the above-identified patent and that said Letters Patent is hereby corrected as shown below:

Title page, item [54] and column 1, lines 1-6, delete the title and insert the following title:

WRITE CONTROLLER FOR A CAM-BASED SWITCH
WITH LINEARLY SEARCHABLE MEMORY
UTILIZING HARDWARE-ENCODED STATUS TAGS
TO INDICATE AVAILABILITY OF EACH
MEMORY LOCATION FOR WRITING

Signed and Sealed this

Thirteenth Day of April, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO : 5,813,040
DATED : September 22, 1998
INVENTOR(S) : John Edmund Rathke It is certified that error appears in the above-identified patent and that said Letters Patent is hereby corrected as shown below:

On title page, item [73]
--GTE Laboratories Incorporated, Waltham, Massachusetts--.

Signed and Sealed this

Eighth Day of February, 2000

Attest:

Q. TODD DICKINSON

Attesting Officer

Commissioner of Patents and Trademarks